(12) United States Patent
Kawashima et al.

(10) Patent No.: US 7,018,101 B2
(45) Date of Patent: Mar. 28, 2006

(54) MATERIAL FOR RAIL OF LINEAR GUIDE, RAIL FOR LINEAR GUIDE, PROCESS OF MANUFACTURING RAIL OF LINEAR GUIDE, AND LINEAR GUIDE

(75) Inventors: Kunio Kawashima, Maebashi (JP); Hidenori Kawai, Maebashi (JP); Masaru Akiyama, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/361,534

(22) Filed: Feb. 5, 2003

(65) Prior Publication Data

US 2003/0123761 A1 Jul. 3, 2003

Related U.S. Application Data

(63) Continuation of application No. PCT/JP02/06111, filed on Jun. 19, 2002.

(30) Foreign Application Priority Data

Jun. 21, 2001 (JP) .............................. 2001-188387
Jun. 10, 2002 (JP) .............................. 2002-168279

(51) Int. Cl.
*F16C 29/06* (2006.01)
(52) U.S. Cl. ........................................................ 384/45
(58) Field of Classification Search .................. 384/45, 384/43, 44; 464/168
See application file for complete search history.

(56) References Cited

U.S. PATENT DOCUMENTS

| | | | |
|---|---|---|---|
| 4,025,995 A | 5/1977 | Thomson | |
| 4,593,957 A | 6/1986 | Hidano | |
| 4,635,331 A | 1/1987 | Walter et al. | |
| 5,018,878 A | 5/1991 | Tsukada et al. | |
| 5,250,126 A | 10/1993 | Ohya et al. | |
| 5,542,991 A | 8/1996 | Muraoka et al. | |
| 5,564,188 A | 10/1996 | Akasako et al. | |
| 5,699,604 A | 12/1997 | Fukui | |
| 6,200,031 B1 * | 3/2001 | Faulhaber et al. | 384/45 |
| 6,508,589 B1 | 1/2003 | Kashiwagi et al. | |
| 2001/0012417 A1 | 8/2001 | Kashiwagi et al. | |
| 2003/0070465 A1 | 4/2003 | Kashawagi et al. | |

FOREIGN PATENT DOCUMENTS

| | | |
|---|---|---|
| JP | 2001-227539 | 8/2001 |
| JP | 2004-028201 | 1/2004 |
| JP | 2004-100916 | 4/2004 |

* cited by examiner

*Primary Examiner*—Lenard A. Footland
(74) *Attorney, Agent, or Firm*—Christensen O'Connor Johnson Kindness PLLC

(57) ABSTRACT

The top portion of a material for a rail of a linear guide is formed in a convex shape. In this convex shape, portions protruding to the side of a top surface are removed beforehand by rolling raceway grooves in side portions of a member of rectangular section, the top surface of which is flat. A rail made from this material by rolling raceway grooves in side portions have a flat top surface.

2 Claims, 5 Drawing Sheets

MATERIAL FOR RAIL OF LINEAR GUIDE, RAIL FOR LINEAR GUIDE, PROCESS OF MANUFACTURING RAIL OF LINEAR GUIDE, AND LINEAR GUIDE

CROSS-REFERENCE TO RELATED APPLICATIONS

This is a Continuation Application of PCT Application No. PCT/JP02/06111, filed Jun. 19, 2002, which will be published under PCT Article 21(2) in English.

This application is based upon and claims the benefit of priority from the prior Japanese Patent Applications No. 2001-188387, filed Jun. 21, 2001; and No. 2002-168279, filed Jun. 10, 2002, the entire contents of both-of which are incorporated herein by reference.

BACKGROUND OF THE INVENTION

1. Field of the Invention

The present invention relates to a material for a rail of a linear guide, which is applied to industrial machinery and devices, etc. and formed by rolling, a rail for a linear guide, a process of manufacturing a rail of a linear guide, and a linear guide.

2. Description of the Related Art

A linear guide is used to smooth the linear movements of industrial machinery and devices, etc. with good accuracy. A linear guide comprises a rail, balls and a slider. In the rail, a raceway groove is formed in each of both side surfaces, which are two surfaces parallel to each other. The balls come into rolling contact with these raceway grooves. The slider moves along the rail via the balls.

In making a rail, its contour and raceway grooves are primarily made by drawing a member of rectangular section. In a rail, heat treatment (quenching) of raceway grooves etc. is performed after a wire groove for the introduction of a wire retainer is machined in the bottom portion of the raceway grooves. After the heat treatment, a mounting hole for fixing is drilled in the rail. And after the finishing of the bottom and top surfaces of the rail by grinding, the rail is fixed to a surface plate etc. by use of the mounting hole, and finally, the raceway grooves are finished by grinding. A rail obtained by drawing has a good contour and hence it is possible to reduce the amount of grinding after that.

However, when raceway grooves are formed with good accuracy by drawing, a rail must be drawn at a plurality of steps. Moreover, production cost is high because there are many operations incidental to drawing, such as preparatory machining for introducing the material into drawing dies and anneal heat treatment. Furthermore, when the raceway grooves are finished by grinding, the rail is fixed to a surface plate by use of a mounting hole of the rail. Therefore, it is necessary that the drilling of the mounting hole be performed before the finishing process of the raceway grooves.

As disclosed in Jpn. Pat. Appln. KOKAI Publication No. 2001-227539, there is a process of forming raceway grooves in a rail by rolling. In this case, it is possible to form raceway grooves by one rolling operation. However, a portion of the material is pushed away when raceway grooves are formed in two side surfaces of the material, which are parallel to each other, by means of roller dies, and this part of the material appears as bulges that protrude in both transverse side portions of the top and bottom surfaces, which are other two surfaces between the two side surfaces. Because the raceway grooves are formed in the side surfaces which are close to the top surface side of the rail, they protrude to a greater degree from the top surface side than from the bottom surface side.

Although the concave top surface in which the two transverse side portions bulge and the middle portion sinks has no effect on the operating accuracy of the linear guide, dust and the like are apt to accumulate on this concave top surface. For this reason, due to dust and the like which have accumulated, seals attached to the slider wear and the sealing property may sometimes deteriorate. When the top surface is chipped away until it becomes flat in order to prevent dust from accumulating on the top surface, residual stresses given during rolling are released, resulting in a decrease in the straightness of the rail and raceway grooves. For this reason, in consideration of the balance of residual stresses it is necessary to chip other portions away or separately to perform stress releasing, and production cost increases.

Even if the bottom surface is bulged a little by rolling, a rail having such a bottom surface can be used as it is if good stability is ensured during rail mounting. However, because the middle portion of this rail comes into a floating condition, controlling the tightening torque of bolts for amounting the rail becomes important in order to satisfy the operating accuracy of the linear guide. Furthermore, if the amount of protrusion is large, variations occur in the flatness of the bottom surface and the bottom surface becomes unstable during rail mounting. Therefore, it is necessary to perform flattening again by grinding or cutting. In this case, if the amount of machining is large, strains given by rolling are released and hence it becomes necessary to perform stress removing after working.

BRIEF SUMMARY OF THE INVENTION

In a material for a rail of a linear guide related to the invention, the amount of working after the rolling of raceway grooves is small. The object of the invention is to provide an inexpensive rail of a linear guide, a process of manufacturing a rail of a linear guide, and a linear guide by rolling raceway grooves by use of a material for a rail of a linear guide related to the invention.

A material for a rail of a linear guide related to the invention comprises a surface which is formed in a convex shape by removing beforehand two transverse side portions of the surface, which are deformed by the rolling of a raceway groove, near the surface, in each of two side surfaces which are provided at both transverse ends of the surface.

In a rail for a linear guide related to the invention, the above-described surface is made flat by rolling a raceway groove near the surface in each of two side surfaces by use of the above-described material.

In a rail for a linear guide related to the invention, the distance from the center position of raceway grooves formed by rolling in each of two side surfaces provided in two transverse end portions of a surface to this surface is not less than 2.25 times the diameter of rolling elements, which are in rolling contact with the raceway grooves.

In a rail for a linear guide related to the invention, after the rolling of raceway grooves in two side surfaces of the material, a mounting hole is made in such a manner that the mounting hole opens to at least either a surface between the two side surfaces or a surface opposed to this surface. The material used in the rail comprises a surface which is formed in a convex shape by removing beforehand two transverse side portions of the above-described surface, which are deformed by the rolling of a raceway groove, near the surface, in each of two side surfaces which are provided at both transverse ends of the surface.

A process of manufacturing a rail of a linear guide related to the invention comprises a preparatory process, a rolling process and a hole-making process which is performed after this rolling process. The preparatory process involves preparing a material for a rail of a linear guide, which comprises a surface formed in a convex shape by removing beforehand two transverse side portions of the surface, the two transverse side portions being deformed by the rolling of a raceway groove, near the surface, in each of two side surfaces, which are provided at both transverse ends of the surface. In the rolling process, the raceway grooves are made by rolling at the side surface of this material. And in the hole-making process, a mounting hole is made in such a manner that the mounting hole opens to at least either the surface or a surface corresponding to this surface.

In another process of manufacturing a rail of a linear guide related to the invention, after the finish operation of raceway grooves which are made by rolling at each of two mutually parallel side faces and to which rolling elements come into rolling contact, hole-making operation is performed to provide a mounting hole. The mounting hole opening at least to a surface which is on the mounting side of two surfaces provided between the above-described two side surfaces along a direction in which the above-described raceway groove extends.

A linear guide related to the invention comprises a rail and a moving body. In the rail, after the rolling of a raceway groove in each of two side surfaces, a mounting hole is made in such a manner that the mounting hole opens to at least either the surface between the two side surfaces or a surface corresponding to this surface. The moving body comprises routes in which a plurality of rolling elements are circulated, and moves relative to the rail along this rail via the rolling elements. The material for the rail comprises a surface which is formed in a convex shape by removing beforehand two transverse side portions of the surface, which are deformed by the rolling of raceway grooves, near the surface, in each of two side surfaces, which are provided at both transverse ends of the surface.

A linear guide related to the invention comprising; a rail, wherein after the finish operation of raceway grooves which are made by rolling in each of two mutually parallel side faces and to which rolling elements come into rolling contact, hole-making operation is performed to provide mounting holes. The mounting holes open at least at a surface which is on the mounting side of two surfaces provided between the two side surface along a direction in which the raceway grooves extend; and The moving body, which comprises routes in which a plurality of rolling elements are circulated, and moves relative to the rail along this rail via the rolling elements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of the invention.

DETAILED DESCRIPTION OF THE INVENTION

Figure 1:
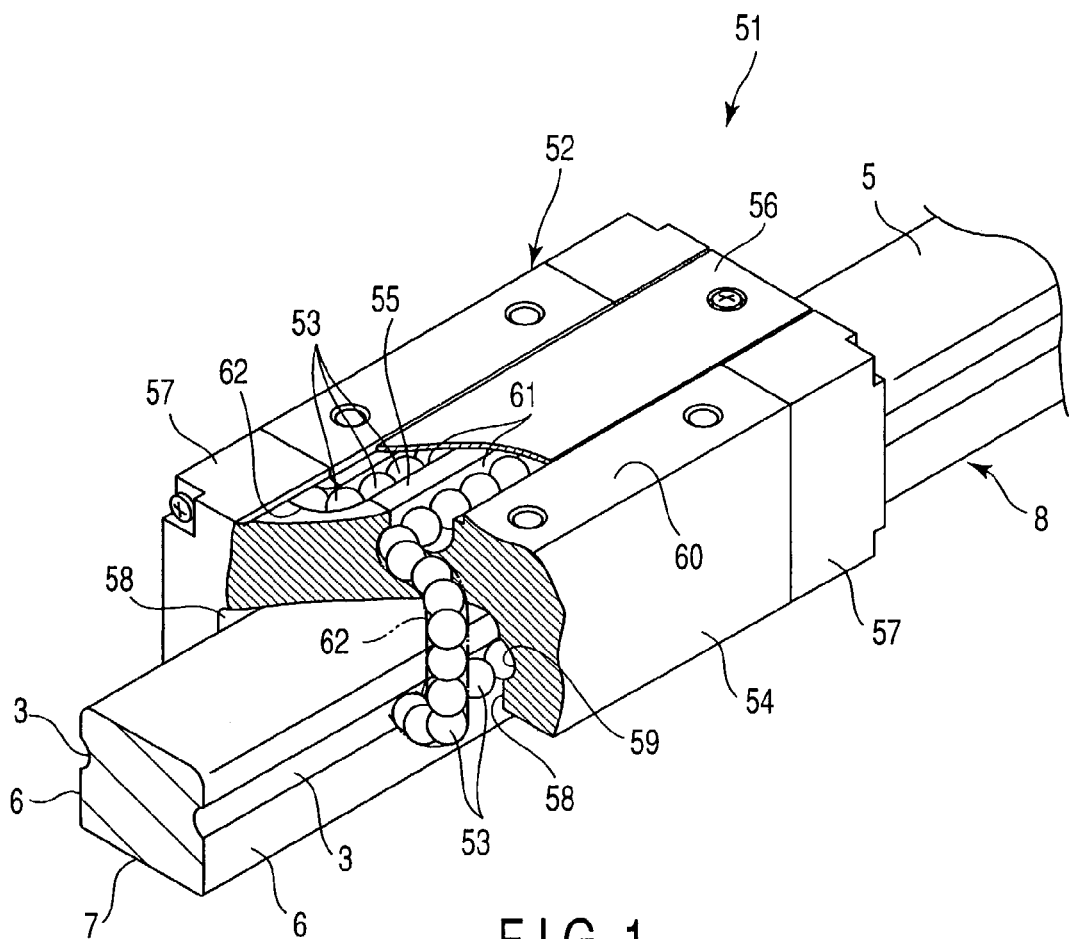
FIG. 1 is a partially cutaway, perspective view of a linear guide related to an embodiment of the invention.

An embodiment related to the present invention will be described below with the aid of a linear guide 51 as an example by referring to FIGS. 1 to 11. The linear guide 51 shown in FIG. 1 comprises a slider 52, a rail 8 and balls 53.

The slider 52 is an example of a moving body and comprises a main body 54, a separator 55, a cover 56 and end caps 57. The main body 54 is made of a beam by cutting to a prescribed length. The beam is formed by drawing a steel material. The main body 54 is formed so as to cover the top surface 5 and both side surfaces 6 of a rail 8. Raceway grooves 59 are formed in the inner surfaces 58 of the main body 54. The inner surfaces 58 face the side surfaces 6 of the rail 8. These raceway grooves 59 form pairs with raceway grooves 3 formed in the side surfaces 6 of the rail 8 and are finished by grinding.

Return paths 61 are formed in a top-surface deck 60 of the main body 54 on the side opposite to the surface facing the top surface 5 of the rail 8. These return paths 61 are formed as a groove shape at the same time with drawing. Two lines of return paths 61 are formed because the separator 55 is provided in the middle of the groove, and the entire return paths 61 are closed by the cover 56. Incidentally, two lines of groove may be formed as the return paths 61 during drawing instead of installing the separator 55.

The end caps 57 are attached to both ends of the main body 54 in the moving direction. Ascent/descent paths 62 are formed in the interior of the end caps 57. The ascent/descent paths 62, along with the raceway grooves 3, 59 and the return paths 61, form circulation paths.

The balls 53, which are an example of rolling elements, are loaded in the circulation paths and come into rolling contact with each of the raceway groove 3 of the rail 8 and the raceway groove 59 of the main body 54. The balls 53 which have rolled out from between the raceway grooves 3, 59 are fed to the return paths 61 by the ascent/descent paths 62, and the balls 53 which have rolled out from the return paths 61 are returned to between the raceway grooves 3, 59 by the ascent/descent paths 62.

Figure 2:
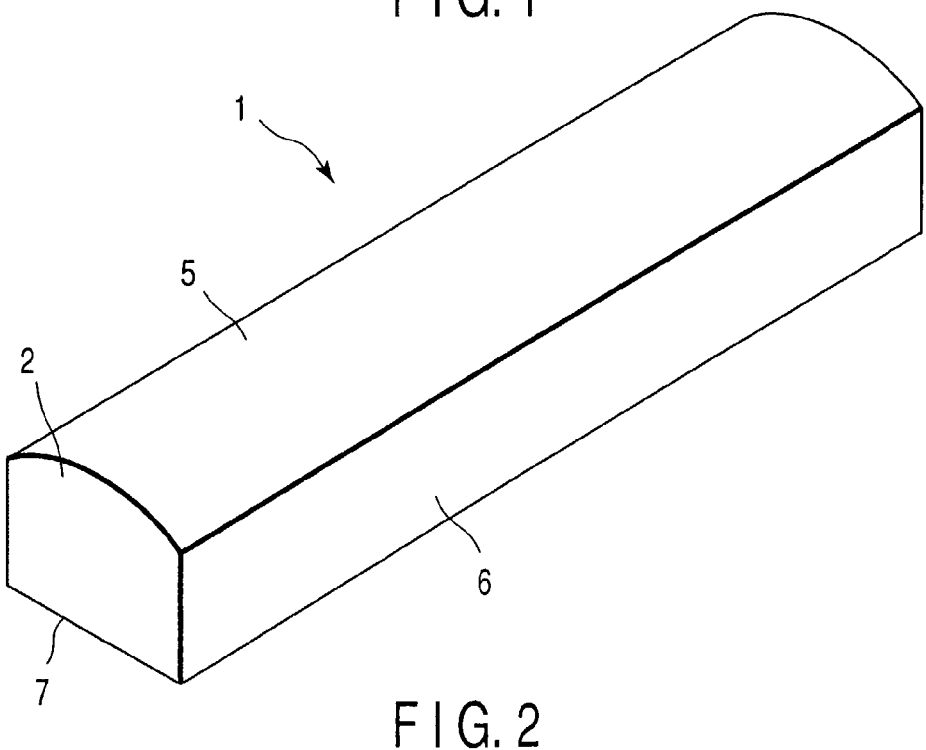
FIG. 2 is a perspective view of a material for a rail of the linear guide of FIG. 1.
Figure 6:
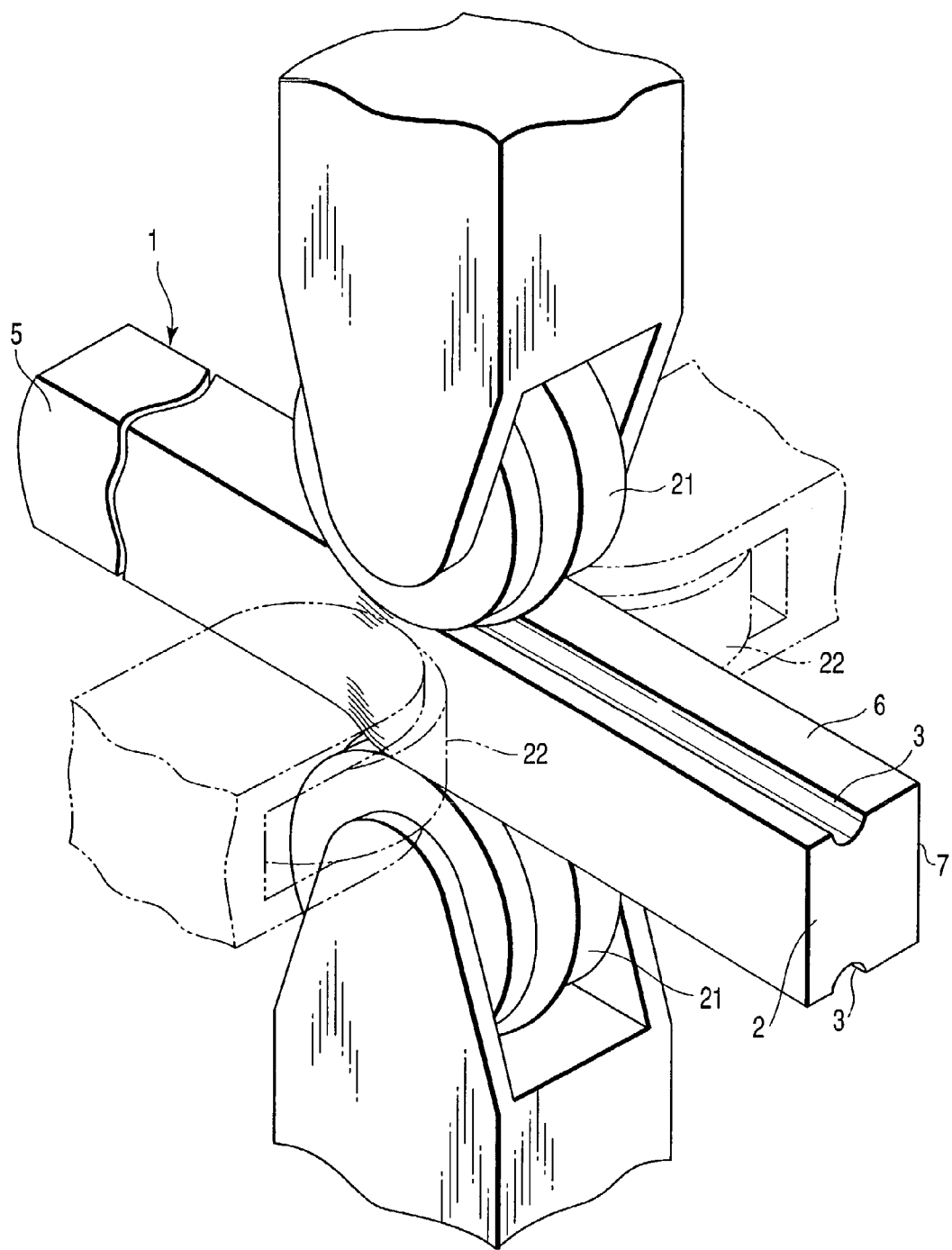
FIG. 6 is a perspective view of the rolling process for forming raceway grooves in the side surfaces of the material of FIG. 2.

The rail 8 is made from the material 1 shown in FIG. 2 and the raceway grooves 3 are formed by the rolling process shown in FIG. 6. The material 1 for the rail 8 comprises, as shown in FIG. 2, two side surfaces 6 which are parallel to each other, a top surface 5, which is one of the two surfaces provided between the side surfaces 6, and a bottom surface 7, which is another surface opposed to the top surface 5. A top portion 2 formed by the top surface 5 has a convex shape, which bulges in the middle of the width direction in the state of the material 1. The shape of this top portion 2 is determined on the basis of the shape of a top surface 14 (the alternate long and two short dashes line of FIG. 3B), which is obtained when the raceway grooves 3 with which the balls 53 come into rolling contact are rolled in side portions 12 of a member 11 having a rectangular section, which is indicated by the alternate long and two short dashes line of FIG. 3A.

That is, the shape of this top portion 2 is a shape which is obtained by removing beforehand two transverse side portions 15a, 15b of the top portion 2 according to the deformation of the two transverse side portions 15a, 15b during the process of forming the raceway grooves 3 in the side surfaces 6 by rolling. More specifically, the shape of this top portion 2 is a convex shape (the solid line of FIG. 3A, which is obtained by removing portions 15a', 15b' protruding from the top surface 14 of the member 11, as indicated by the alternate long and two short dashes line of FIG. 3B, when the raceway grooves 3 are rolled in the side portions 12 of the member 11.

Figure 3A:
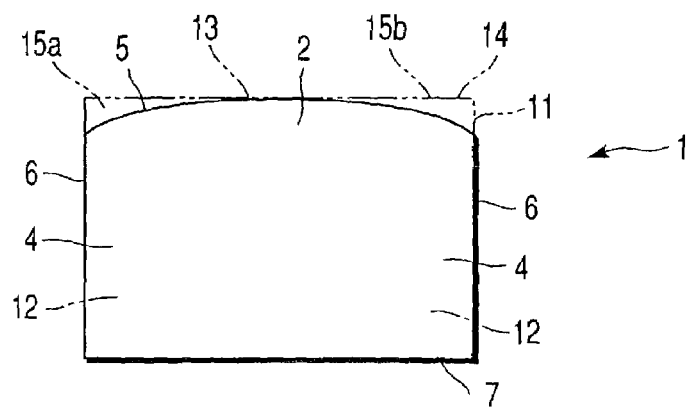
FIG. 3A is a front view of the material of FIG. 2.
Figure 3B:
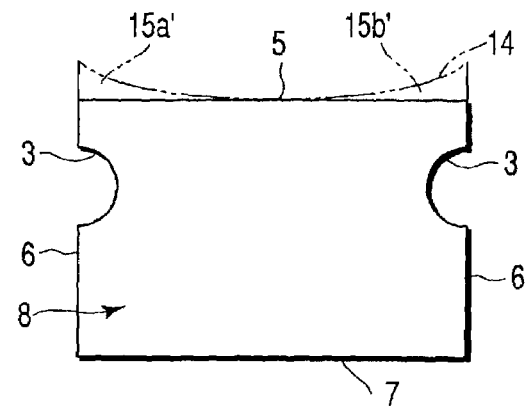
FIG. 3B is a front view of a rail made by rolling raceway grooves in the side surfaces of the material of FIG. 2.

And when the raceway groove 3 is rolled in a position near the top surface 5 of the side portion 4 of this material 1, as indicated by the solid line of FIG. 3B, the two transverse side portions of the top portion 2 are deformed so as to bulge and the top surface 5 becomes flat.

Incidentally, in this embodiment, the top portion 2 is shown in a convex shape which protrudes in the form of a circular arc in the width direction. However, because the size of the protruding portions 15a', 15b' varies depending on the material quality of the material 1, the number, place and shape of rolled raceway grooves 3, etc., details of the convex shape of the material 1 is determined according to the specifications of each rail. On this occasion, the convex shape of the material 1 may be a shape obtained by measuring the protruding portions 15a', 15b' of an actual test piece of rectangular section and subtracting the protruding portions 15a', 15b' or a shape obtained by performing inverse operations by a numerical analysis using the finite element method, etc.

Figure 4:
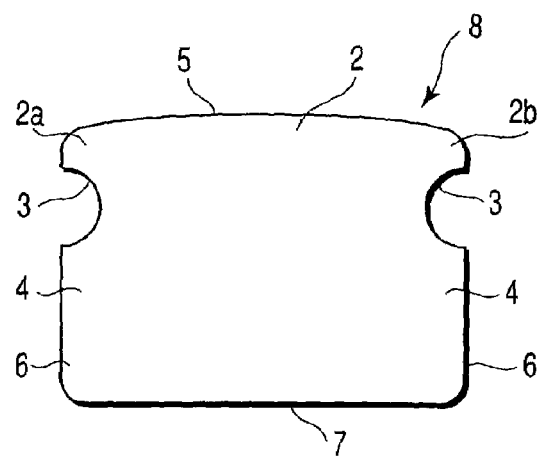
FIG. 4 is a front view of a rail, the top surface of which is formed in a convex shape by rolling the material of FIG. 2.
Figure 5:
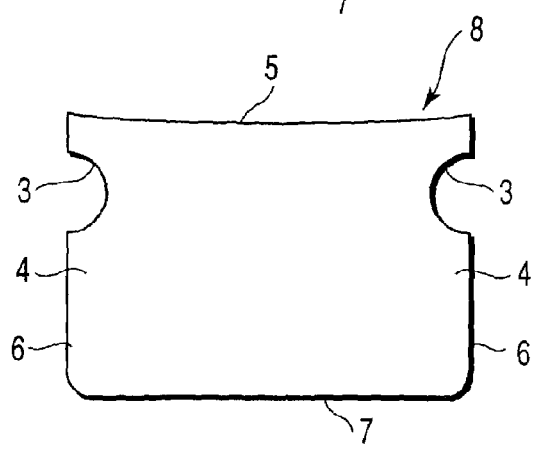
FIG. 5 is a front view of a rail, the top surface of which is formed in a concave shape by rolling the material of FIG. 2.

Also, in this embodiment is shown an example in which the shape of the top portion 2 of the material 1 is a convex form which protrudes in the form of a circular arc in the width direction and the top surface 5 becomes a flat surface when the raceway grooves 3 are rolled in the side portions 4. However, the top surface 5 may not be a completely flat surface. That is, as shown in FIG. 4, corners 2a, 2b of the top portion 2 may be roundish and the top portion 2 may have a slightly convex shape as a whole. Also, as shown in FIG. 5, the top surface 5 may be a slightly concave. However, in consideration of the fact that foreign matter is not apt to accumulate, or that it is easy to exclude foreign matter by means of a seal, the rail 8 of the convex shape shown in FIG. 4 is more preferable than the rail 8 of the concave shape shown in FIG. 5. That is, the contour of the material 1 is manufactured beforehand in the preparatory process so that by rolling the raceway grooves 3 in the two side portions 4 of the material 1, the rail 8 is formed in a shape almost the same as finally desired.

Figure 7:
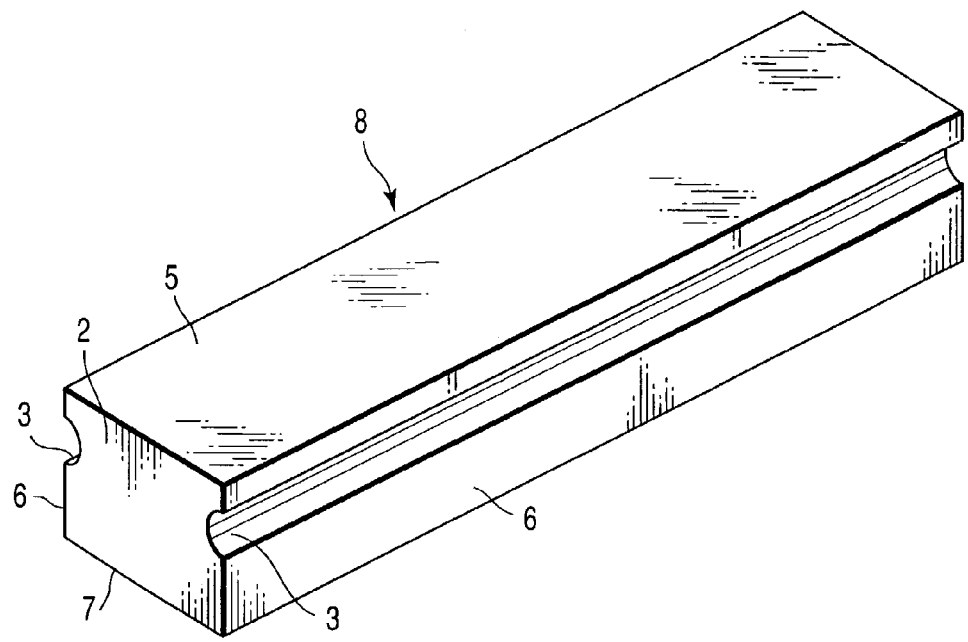
FIG. 7 is a perspective view of a rail made after passing through the rolling process of FIG. 6.

In the material 1 formed as described above, the raceway grooves 3 are formed by what is called through feed rolling. Through feed rolling is a manufacturing technique in which, as shown in FIG. 6, the material 1 is fed through roller dies 21 positioned at a prescribed interval, with the sides 6 of the material 1 facing to the vertical direction. In this process, the top and bottom surfaces 5, 7 of the material 1 are supported from both sides by positioning rollers 22 so that the position of rolling the raceway grooves 3 does not shift. When the material 1 is pushed into the roller dies 21 by feed rollers (not shown), the raceway grooves 3 are rolled at the side surfaces 6 and, at the same time, the top surface 5 which had a convex shape is deformed into a flat surface which is parallel to the bottom surface 7. As shown in FIG. 7, a rail 8 in which raceway grooves 3 dented from the side surfaces 6 are rolled is obtained.

In this rail 8, the top surface 5 becomes flat because the raceway grooves 3 are rolled at the side surfaces 6 and hence dust hardly accumulates. Therefore, operation for finishing the top surface 5 flat after the rolling can be omitted or even if this operation is necessary, the operation itself can be performed lightly. Furthermore, because the raceway grooves 3 are formed by rolling, the finished surface roughness is good. Therefore, in some required specifications, it is only necessary to correct straightness for strain reasons, and finishing process, such as grinding, of the raceway grooves 3 are unnecessary. In other words, the finishing is performed by the rolling.

Figure 8:
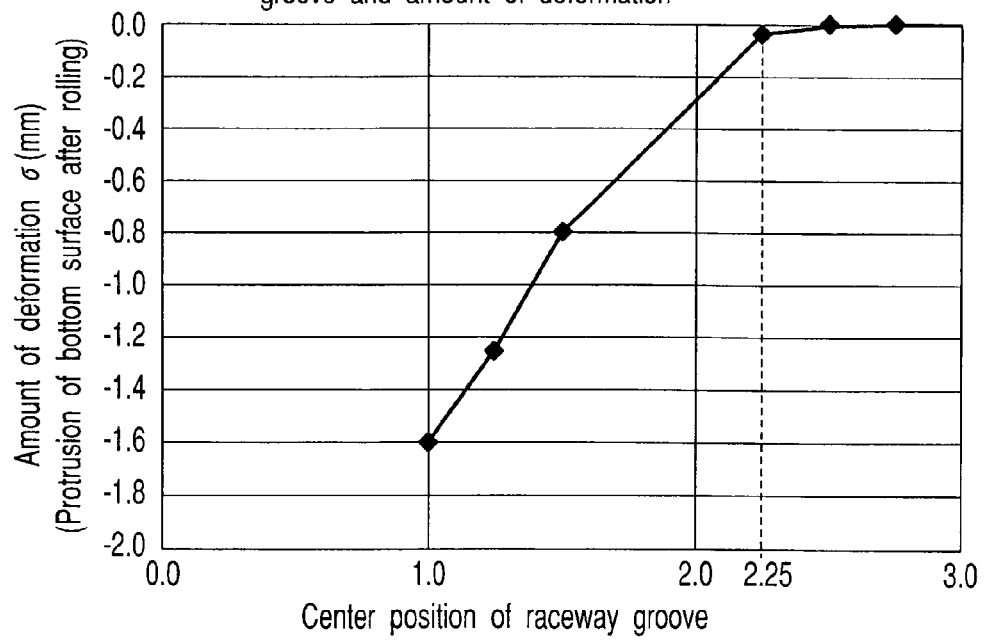
FIG. 8 is a diagram of the relationship between the distance from the bottom surface to the center position of the raceway grooves and the amount of deformation of the bottom surface when the raceway grooves are formed by rolling in the side surfaces of the material of FIG. 2.
Figure 9:
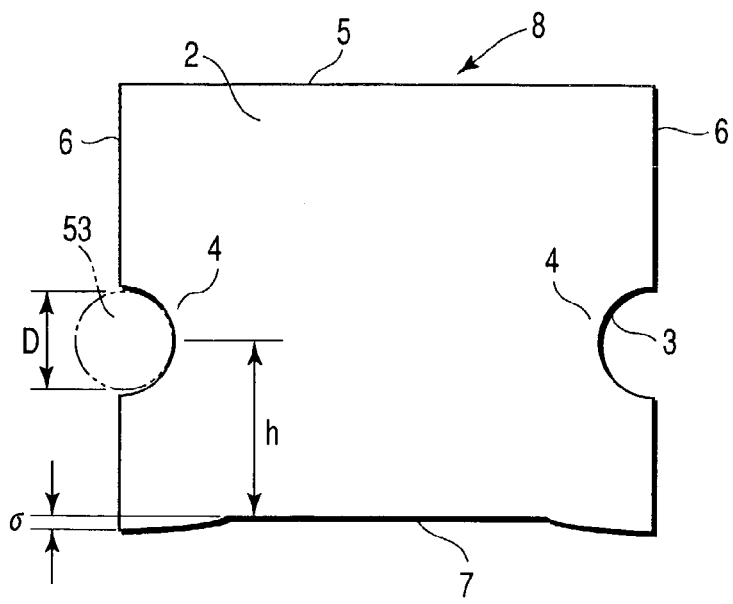
FIG. 9 is a view of the dimensional relationship of the rail of FIG. 8.

When the raceway grooves 3 are rolled in the side surfaces 6 near a surface provided between the two side surfaces 6, the effect on the bottom surface 7, which is an example of a surface, i.e., the relationship between the center position of the raceway grooves 3 and the amount of deformation σ is as shown in FIG. 8. According to this figure, the amount of deformation σ protruding toward the bottom surface 7 tends to decrease with increasing distance h from the bottom surface 7 to the center position of the raceway grooves 3 shown in FIG. 9. It became apparent that the bottom surface 7 is little deformed when the distance h from the bottom surface 7 to the center position of the raceway grooves 3 becomes longer than a certain value, concretely, when the distance h becomes not less than about 2.25 times the diameter D of the balls 53. Therefore, by ensuring that the distance h from the bottom surface 7 to the center position of the raceway grooves 3 is not less than 2.25 times the diameter D of the balls 53, it is also possible to omit other operations of the bottom surface 7 after the rolling.

Incidentally, an advantage is obtained by the following measure even when because of a small height of the rail 8, it is impossible to ensure a sufficient distance h from the bottom surface 7 to the center position of the raceway grooves 3, i.e., a distance h corresponding to not less than 2.25 times the diameter D of the balls 53. That is, in this case, the manufacturing for making the bottom surface 7 flat after the rolling of the raceway grooves 3 can be omitted or performed lightly by forming the bottom portion of the material 1, as with the top portion 2, in a convex shape in the direction of the bottom surface 7, from which portions protruded from the bottom surface 7 by the rolling of the raceway grooves 3 are removed beforehand.

Figure 10:
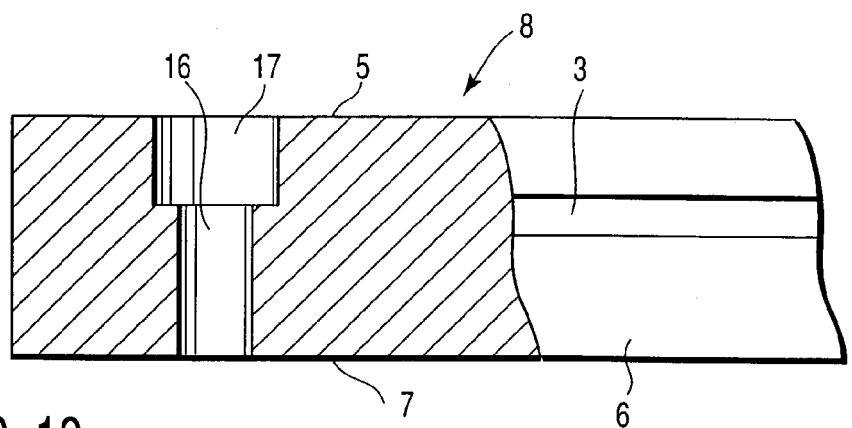
FIG. 10 is a partially sectional, side view of a rail obtained by making a mounting hole in the rail of FIG. 7.

In the rail 8 in which the raceway grooves 3 are formed, mounting holes 16 are made as shown in FIG. 10. The mounting holes 16 pierce the rail 8 from the top surface 5 to the bottom surface 7. A counterbore 17 is provided on the top surface side of each mounting hole 16. The depth of the counterbore 17 is such that the head of the mounting bolt does not protrude from the top surface 5 of the rail 8. In this manner the mounting holes 16 are made at the hole-making process after the raceway grooves 3 are formed at the rolling process.

Therefore, the mounting holes 16 are not affected by the deformation of the rail 8 due to the rolling process and pitch errors are small.

Figure 11:
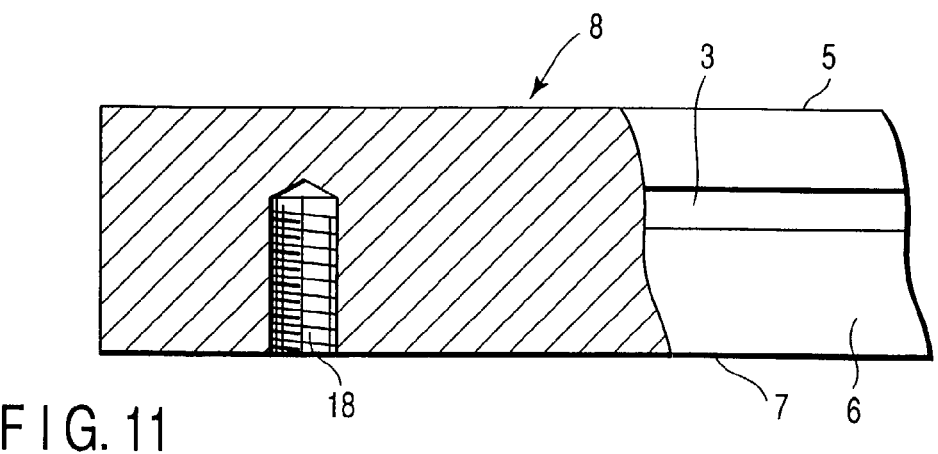
FIG. 11 is a partially sectional, side view of a rail obtained by making a screw hole in the rail of FIG. 7.

In place of the mounting holes 16 which pierce from the top surface 5 to the bottom surface 7 shown in FIG. 10, screw holes 18 which open to the bottom surface 7, which is an surface on the mounting side of the rail 8, may be provided as shown in FIG. 11. In this case, foreign matter such as dust is not apt to accumulate and cleaning is also easy because the top surface 5 is not open.

Because the invention is applied to linear guides in general when they comprise a rail in which raceway grooves are formed by rolling, the invention can provide an inexpensive linear guide.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A linear guide comprising:
   a rail having a top surface formed in a convex shape as a whole, wherein the distance (h) from the center position of raceway grooves formed by rolling each of two side surfaces to a bottom surface is not less than 2.25 times the diameter of rolling elements which are in rolling contact with said raceway grooves; and
   a moving body, said moving body comprising paths in which a plurality of rolling elements are circulated and moving relative to the rail along said rail via said rolling elements.

2. A rail for a linear guide, wherein the distance from the center position of raceway grooves formed by rolling in each of two side surfaces of the rail to a bottom surface is not less than 2.25 times the diameter of rolling elements which are in rolling contact with said raceway grooves, further comprising a top surface formed in a convex shape as a whole.

* * * * *